R. A. MINTERN.
CULTIVATING IMPLEMENT.
APPLICATION FILED DEC. 11, 1916.

1,215,322.

Patented Feb. 6, 1917.

Inventor:-
Richard Albert Mintern
By:- B. Singer atty.

UNITED STATES PATENT OFFICE.

RICHARD A. MINTERN, OF HORSHAM, VICTORIA, AUSTRALIA.

CULTIVATING IMPLEMENT.

1,215,322.  Specification of Letters Patent.  Patented Feb. 6, 1917.

Original application filed September 28, 1916, Serial No. 122,662. Divided and this application filed December 11, 1916. Serial No. 136,327.

*To all whom it may concern:*

Be it known that I, RICHARD ALBERT MINTERN, a subject of the King of Great Britain, residing in Wilson street, Horsham, in the State of Victoria, Commonwealth of Australia, have invented new and useful Improvements in Cultivating Implements, of which the following is a specification.

This invention relates to improvements in wheeled implements and it resides particularly in the provision of means whereby a high wheel cultivator can be operatively connected to the front of a seed drill or worked separately as designed. The invention, furthermore, embodies certain novel features of construction and arrangements of parts which serve to make the traction and running gear of the cultivator economical and highly efficient in use.

The present application is a division of my application filed September 28th 1916, Serial No. 122662. Referring now to the accompanying sheets of explanatory drawings:—

Figure 1:
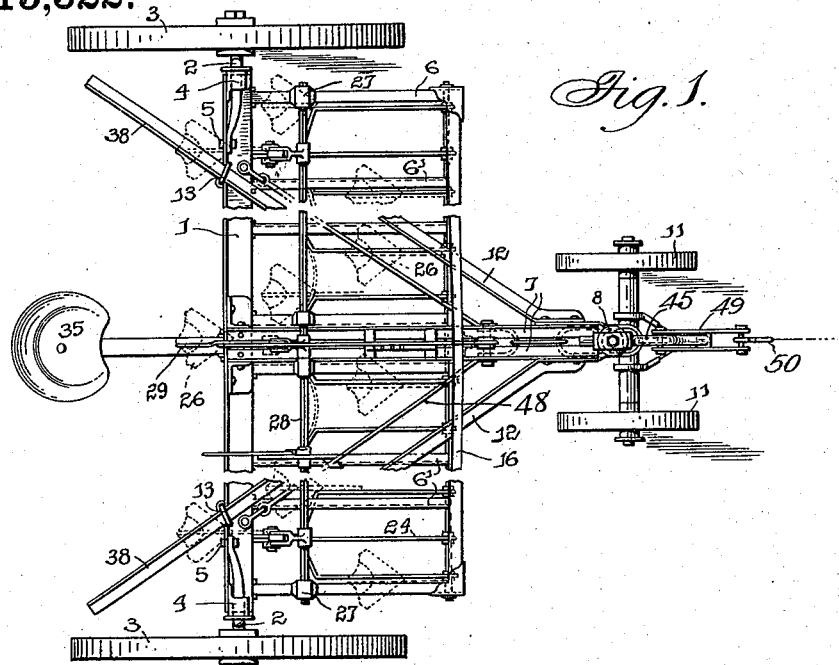
Figure 1 is a view in plan of a wheeled implement constructed in accordance with the invention and showing parts of the implement removed for convenience of illustration.
Figure 2:
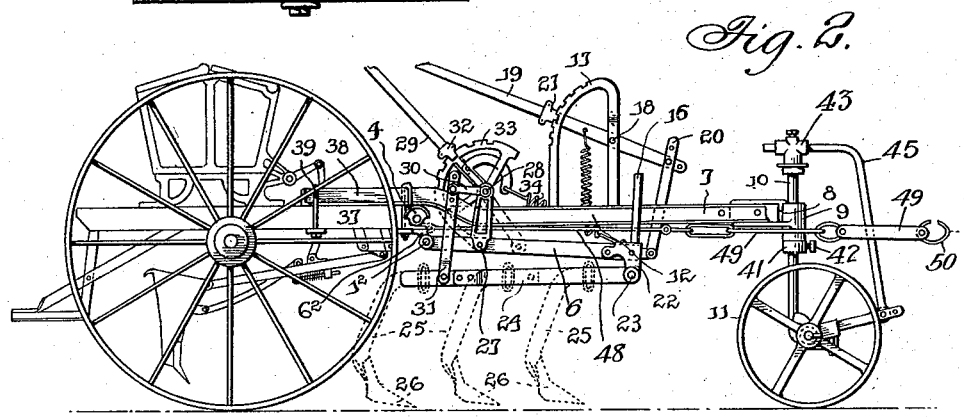
Fig. 2 is a view in side elevation showing the implement of Fig. 1 fitted to a second implement of different specific character, such for instance as a seed drill.
Figure 3:
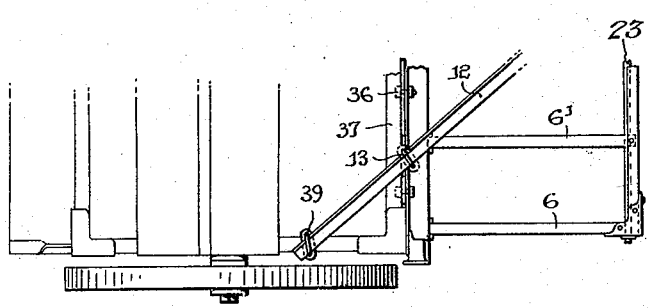
Fig. 3 is a view in plan of parts of the cultivator and a seed drill and shows the manner of detachably connecting the two implements.

In the drawings like characters of reference have been employed to indicate similar or corresponding parts in the different views and the numeral 1 designates a stout axle beam of angle iron the ends of which are fitted with cranked stub axles 2 on which are mounted high transport wheels 3. The stub axles 2 are secured removably to the ends of the beam 1 by means of collars 4 and bolts 5 or the like means. A frame 6 made of light angle iron and reinforcing bars 6¹ of the same material is pivotally mounted on a rod 1² which is supported in projections 6² fitted to the stout beam 1 at suitable points.

The central part of the axle beam 1 is furnished with a forwardly projecting beam 7 formed of one stout or two light angle iron bars and to the forward end of said beam is fitted a casting 8 having a vertical boss 9 for accommodating the post 10 of steering wheels 11 of approved form. The axle beam 1 and the forwardly extending beam 7 form a rigid T-shaped frame for supporting the operative parts of the implement. In lieu of employing a pair of steering wheels 11 as shown in the drawings, I may substitute any standard arrangement of steering wheels.

The rear end of the beam 7 is rigidly mounted on the center of the beam 1 and its forward end is stayed by diagonal bars 12 which are clamped to the said beam 1 at 13.

A vertical guide not shown is fitted to the center of the front member of the frame 6 and extends on each side the beam 7 so as to guide the frame 6 and maintain the same against lateral stresses in position and to permit of the forward part of the said frame 6 being raised and lowered as desired. The guide just mentioned is connected with stays such as 16 which extend across the top of 15 toward the ends of frame 6 and insure rigidity to the structure under all ordinary working stresses.

A quadrant 17 is fitted to the beam 7 and a bolt 18 passing through the forward leg of said quadrant pivotally supports a lever 19. The forward end of the lever 19 is connected by a link 20 to the forward part of the frame 6 and by operating said lever the forward end of said frame 6 can be raised and lowered as and when required.

The lever 19 is furnished with a pawl 21 which is adapted to engage with the teeth of the quadrant 17 in the usual manner.

The ends of the front bar of the frame 6 are fitted with depending brackets 22 which are designed to support the ends of a bar 23. The forward ends of yoke-shaped sections 24 are pivotally mounted on the bar 23 and to the said sections are clamped a plurality of tynes 25 furnished with an approved form of share 26.

Two or more standards 27 are fitted near to the back of the frame 6 and a transverse rod 28 is mounted in bosses formed on the upper ends of said standards. A lever 29 is fitted rigidly to the rod 28 and projects upwardly therefrom at an approved angle.

An arm 30 projects rearwardly from the transverse rod 28 above the center of each section 24 and a link 31 connects the outer end of said arm to the section directly beneath. The lever 29 is provided with a pawl 32 which is adapted to be engaged by the teeth of a quadrant 33 fitted to the frame 6 for holding lever 29 in adjusted position.

The lever 29 is operated to raise and lower the back ends of the sections 24 as desired and to facilitate the raising operation a strong tension spring 34 is arranged to exert a constant forward pull on the lever.

The beam 1 is provided with a detachable seat 35 for the driver and the operating levers 19 and 29 are placed so as to be grasped conveniently by the driver when seated thereon. The forward end of the beam 7 is adjusted on the post 10 of the steering wheel 11 by moving a collar 41 on said post to the position desired and then clamping it firmly by means of a set screw 42. Diagonally disposed hauling bars 48 are secured to the beam 1 at their rear ends and their forward ends are connected to links 49 which pass forwardly and embrace the bar 45. A hook 50 is fitted to the forward end of the links 49 to engage the swingle tree to which the draft animals are coupled.

When the implement is intended to be used with a seed-drill the driver's seat 35 and the traveling wheels 3 and their axles 2 are detached from the beam 1. When the parts above-mentioned are detached the rear part of the beam 1 on the frame is connected by means of bolts 36 to the cross beam 37 at the forward part of the rectangular drill frame thereby placing the cultivator directly in advance of the drill hoes. It will be seen that the beam 1 has a vertical web at its rear edge which can be firmly attached to the vertical web at the front edge of the member 37.

In order to insure greater rigidity in the connection between the cultivator and the seed-drill frame the rear ends of the diagonal bars 12 are formed with extensions 38 which are clamped to the seed-drill at 39.

The wheels 3 are identical with those on the seed-drill and as one set of wheels can be used for both implements economy is effected.

When the cultivator is connected to a seed-drill as above described the combined implements will be found extremely useful for tilling fallowed land, sowing grain and distributing manure in the one operation.

The cultivator will operate as efficiently as those at present in use and its novel construction will facilitate its connection to and operation with a seed-drill in such a way that economy will result in farming operations.

The implement can be made in different sizes and the constructional parts thereof suitably modified to suit seed-drills of various sizes or make without departing from the spirit and scope of the invention.

What I do claim is:—

1. A wheeled implement having an axle beam, removable axles on the ends of said beam, transport wheels carried by said axles, a beam fitted to and extending forwardly from the center of the axle beam, diagonal bars connecting the forwardly extending beam to the axle beam, rearward extensions on said diagonal bars, and clamps and bolts for connecting said extensions and said axle beam, respectively, to the frame of a supplemental wheeled implement.

2. The combination of an implement having an axle beam provided with a vertical web at its rear edge, a beam fitted to and extending forwardly from the center of said axle beam, diagonal bars connecting the forwardly extending beam to the axle beam, said bars having rearward extensions projecting beyond said axle beam, with a second implement having a cross beam at its front end, said cross beam having a web at its front end adapted to fit closely against the vertical web of said axle beam and to be firmly clamped thereto, and means whereby said extensions may be fastened to said second implement.

3. A wheeled implement having an axle beam having a vertical web at its rear edge, removable axles on the ends of said beam, transport wheels carried by said axles, a beam fitted to and extending forwardly from the center of said axle beam, diagonal bars connecting the forwardly extending beam to the axle beam, said bars having rearward extensions projecting beyond said axle beam, and means whereby said extensions and said web may be fastened to a supplemental implement frame.

In testimony whereof I affix my signature in presence of two witnesses.

R. A. MINTERN.

Witnesses:
 ALBERT SMYTH,
 C. D. MACRAE.

Copies of this patent may be obtained for five cents each, by addressing the "Commissioner of Patents, Washington, D. C."